US012272905B2

(12) United States Patent
Drake et al.

(10) Patent No.: US 12,272,905 B2
(45) Date of Patent: *Apr. 8, 2025

(54) PLUG-IN CONNECTOR WITH AUTHENTICATION FEATURE

(71) Applicant: Rheem Manufacturing Company, Atlanta, GA (US)

(72) Inventors: Dean Drake, Oklahoma City, OK (US); Melissa Fritz, Rudy, AR (US); Raheel Chaudhry, Dallas, TX (US); Rajendra R. Pai, Bangalore (IN); M. Deepan Ponraj, Chennai (IN)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,297

(22) Filed: Jun. 7, 2024

(65) Prior Publication Data
US 2024/0332871 A1   Oct. 3, 2024

Related U.S. Application Data

(63) Continuation of application No. 18/319,282, filed on May 17, 2023, now Pat. No. 12,034,258, which is a continuation of application No. 18/305,198, filed on Apr. 21, 2023, now Pat. No. 11,967,788.

(60) Provisional application No. 63/363,401, filed on Apr. 22, 2022.

(51) Int. Cl.
*H01R 13/66*     (2006.01)
*H01R 24/30*     (2011.01)
*H01R 107/00*    (2006.01)

(52) U.S. Cl.
CPC .......... *H01R 13/665* (2013.01); *H01R 24/30* (2013.01); *H01R 2107/00* (2013.01)

(58) Field of Classification Search
CPC ............. H01R 13/665; H01R 13/6616; H01R 13/6625; H01R 13/6658; H01R 13/465; H01R 24/30; H01R 2107/00
USPC ............. 439/620.21, 620.22, 620.24, 620.25
See application file for complete search history.

(56) References Cited

U.S. PATENT DOCUMENTS 7,670,147 B1   3/2010   Lee
7,710,743 B2   5/2010   Opsitos, Jr.
8,066,530 B2   11/2011  Masucci et al.
8,870,599 B2   10/2014  Takemoto et al.
(Continued)

OTHER PUBLICATIONS

PCT, "International Search Report & Written Opinion" Application No. PCT/US2023/019416, mailed Jul. 24, 2023, 11 pages.

*Primary Examiner* — Gary F Paumen
(74) *Attorney, Agent, or Firm* — Eversheds Sutherland (US) LLP

(57) ABSTRACT

The disclosure relates to a plug-in connector including a housing having at least two contact terminals received in adjacent terminal receiving cavities. An electric identification device is arranged in the housing and adapted to simultaneously contact the at least two terminals. The electric identification device including a unique identifier, wherein one of the at least two terminals is an output terminal of the identification device, and wherein the unique identifier of the electric identification device is adapted to be read out via the output terminal for authenticating an original equipment manufacturer's parts, such as a plug-in authenticator.

20 Claims, 7 Drawing Sheets

(56) References Cited

U.S. PATENT DOCUMENTS

| | | |
|---|---|---|
| 9,705,259 B2 | 7/2017 | Feldner |
| 11,503,730 B2 | 11/2022 | Yi et al. |
| 11,967,788 B2 * | 4/2024 | Drake .................. H01R 13/665 |
| 12,034,258 B2 * | 7/2024 | Drake ................ H01R 13/6658 |
| 2012/0071021 A1 | 3/2012 | Wu |
| 2015/0087192 A1 | 3/2015 | Tanigawa et al. |
| 2015/0357780 A1 | 12/2015 | Steinbach et al. |
| 2016/0013598 A1 | 1/2016 | Kirkpatrick et al. |
| 2016/0072228 A1 | 3/2016 | Shih |
| 2017/0179744 A1 | 6/2017 | Zhang et al. |
| 2019/0363493 A1 | 11/2019 | Sironi et al. |
| 2020/0185847 A1 | 6/2020 | Feldner et al. |
| 2023/0101861 A1 | 3/2023 | Luo et al. |

\* cited by examiner

PLUG-IN CONNECTOR WITH AUTHENTICATION FEATURE

CROSS-REFERENCE TO RELATED APPLICATIONS

This application is a continuation of U.S. application Ser. No. 18/319,282, filed May 17, 2023, which is a continuation of U.S. application Ser. No. 18/305,198, filed Apr. 21, 2023 and issued as U.S. Pat. No. 11,967,788, which claims the benefit of U.S. provisional Application No. 63/363,401, filed Apr. 22, 2022, all of which are hereby incorporated by reference.

FIELD OF THE DISCLOSURE

This disclosure relates to a plug-in connector.

BACKGROUND

Plug-in connectors are widely used in the electric industry to connect power and/or data supplies with electric devices. The plug-in connectors have to satisfy application specific requirements in order to prevent damage to the electric devices. Therefore, an original equipment manufacturer (OEM) designs the plug-in connector to guarantee that these requirements are satisfied. However, if counterfeit products are used, these application requirements may not be satisfied, damaging the electric devices and potentially posing health and safety risks.

Therefore, the objective of the present disclosure is to provide a plug-in connector which allows for authentication of the assembly of OEM parts.

SUMMARY

In one embodiment, a plug-in connector includes a housing having at least two contact terminals received in adjacent terminal receiving cavities, wherein an electric identification device is arranged in the housing and adapted to simultaneously contact the at least two terminals. The electric identification device includes a unique identifier and one of the at least two terminals is an output terminal of the identification device. The unique identifier of the electric identification device is adapted to be read out via the output terminal for authenticating an OEM part.

With the plug-in connector, the authentication of the parts of the plug-in connector can be verified. Hence, the risk of damaging the electric device due to use of a counterfeit product may be reduced. The customers can authenticate the plug-in connector, further increasing their confidence that the plug-in connector is designed to satisfy the application requirements. Furthermore, warranty disputes arising from a faulty plug-in connector may be avoided, as the identity of the plug-in connector can be proven, i.e., whether it is actually assembled with the OEM's parts or if it is a counterfeit product.

The disclosure can include one or more of the following features, which are independent from one another with respect to their respective technical effects and which can be combined arbitrarily.

For example, the identification device may include a circuit board extending into the terminal receiving cavities, wherein the circuit board includes contact areas arranged within the terminal receiving cavities. The contact areas may be adapted to contact the terminals received in the respective terminal receiving cavity and be in communication with one another. Hence, one terminal may form a reference terminal. The reference terminal may be a ground terminal.

The at least two terminals receiving cavities of the reference terminal and the output terminal may be arranged directly adjacent to one another, reducing the size of the circuit board and the path length of the conductive path connecting the contact areas. With a small circuit board, the weight of the plug-in connector can be further reduced.

In some embodiments, the circuit board is a printed circuit, being substantially U-shaped. The circuit board may include two beams or members extending essentially parallel to one another and being connected by a common base. Hence, each beam or member may be inserted into the respective terminal receiving cavity, wherein the cavities may be separated from one another via an intermediate wall. In order to ensure that the respective terminal is contacted in the corresponding terminal receiving cavity, the contact areas may be provided on the respective beam. Hence, each beam may form a contacting portion and the common base may form a mounting portion to secure the circuit board within the housing.

Plug-in connectors may be subjected to stress such as vibrations. These vibrations may lead to an interruption of the contact between the terminals and the identification device. To counteract such an interruption, the identification device may include resilient contact springs for contacting the respective terminals. For example, the resilient contact springs may be mounted to the circuit board, electrically coupling the contact area of the circuit board with the respective terminal.

The plug-in connector may include multiple terminals receiving cavities for receiving further terminals. Multiple in the sense of this application means two or more, such as at least three up to 15, or more than 15. In some instances, the identification device only contacts two terminals of the multiple terminals. The plug-in connector may include four terminal receiving cavities arranged adjacent to one another. The two terminal receiving cavities in which the reference terminal and the output terminal are received may be arranged immediately next to each other.

Alternatively, the identification device may be an analog electric device. Analog circuits may allow complex designs with multiple components and are generally more difficult to the design then digital circuits. Hence, counterfeiting a plug-in connector with an analog identification device may be further complicated. Other embodiments may use digital identification devices instead of analog electric devices.

In a further embodiment, the identification device may be a combination of a digital and analog device, meaning that it is capable of having a unique analog identifier and a unique digital identifier. A unique analog identifier may result for example from mounting an analog electric component on the conductive path of the circuit board. Again, the analog electric component may be attached to the surface of the circuit board facing away from the terminals.

In an embodiment, the unique identifier is an analog electric parameter determined by a set of analog electric components such as resistance, frequency, capacity, pulse duration modulation or the like. A set of electric components may include at least two to twenty analog electric components. Preferably, the set of analog electric components amounts to at least five or exactly five components. The application of a set of the electric components is particularly advantageous, since the configuration of the unique identifier or even of a set of unique identifiers is further complicated. In order to pass the authentication process, multiple and/or composite unique identifiers would have to be verified. Extensive testing would be required in order to figure out the unique identifier, if at all. Such testing would discourage a counterfeiter from trying to duplicate the plug-in connector.

The analog electric components of the set may particularly be of the same type. For example, each analog electric component of the set may be a resistor, capacitor and the like.

The set of analog electric components can be connected in parallel to one another on the circuit path. Hence, a small amount of electric components may provide a large amount of unique identifiers, wherein some of the unique identifiers correspond to the electric parameter of a single electric component and some unique identifiers correspond to a composite electric parameter of two or more electric components.

The disclosure further relates to an authentication set including a plug-in connector according to any one of the above-mentioned embodiments, a reading unit adapted to read out the unique identifier and an evaluation unit adapted to compare the unique identifier with the predetermined identification information.

The reading unit may be configured to be connected to the output terminal, such that it may automatically read out the values, for example the analog electric parameter values and/or digital values, upon establishing the connection.

A testing connector including the reading unit and/or the evaluation unit may be provided. The testing connector may be a separate part, which allows the customer to verify the authenticity of the plug-in connector prior to installing it in a connection system.

Alternatively, according to an embodiment, the reading unit and/or evaluation unit may be integrated in the connection system, particularly the mating connector and/or the electric device. Unplugging of the plug-in connector and the mating connector in order to authenticate the plug-in connector with the testing connector is avoided. Furthermore, it may be ensured that the plug-in connector is authenticated without pushing the responsibility of authenticating on the customer.

The authentication set may further include a power control unit configured to enable a power and/or data path with the mating connector and/or electric device upon authentication of the OEM's parts. Hence, damage to the electric device may be further automatically prevented since the power and/or data is only transmitted after authentication.

According to an embodiment, the authentication set may include a computer which includes at least one of the reading unit, evaluation unit and, if available, the power control unit. The computer may be a microprocessor allowing an easy integration into the mating connector and/or the electric device.

The amount of unique identifiers of the electric identification device is higher than the amount of predetermined identification information. This may further reduce errors that occur due to unique identifiers being in close ranges to one another.

A set may be provided for assembling the plug-in connector according to any one of the above embodiments. The set may include a housing having at least two contact terminals received in adjacent terminal receiving cavities, an identification device and a plurality of electric components having a unique identifier, the plurality of electric components being adapted to be arranged on the identification device for authentication of the OEM's parts.

Hence, with the set, multiple plug-in connectors may be produced having different unique identifiers dependent on the electric components or combination of electric components used in the assembly of the plug-in connector. This allows a separation of plug-in connectors for different applications.

The disclosure further relates to a method of authenticating an OEM's parts in a plug-in assembly with a plug-in connector according to any one of the above embodiments. The method includes the steps of reading the unique identifier obtained from the identification device and comparing the obtained unique identifier information with predetermined identification information corresponding to the OEM's parts.

According to a further embodiment, the method includes the step of enabling a power and/or data path upon authentication of the OEM's parts.

BRIEF DESCRIPTION OF THE DRAWINGS

In the following, the plug-in connector according to the disclosure is explained in greater detail with reference to the accompanying drawings, in which exemplary embodiments are shown.

In the figures, the same reference numerals are used for elements which correspond to one another in terms of their function and/or structure.

Figure 1:
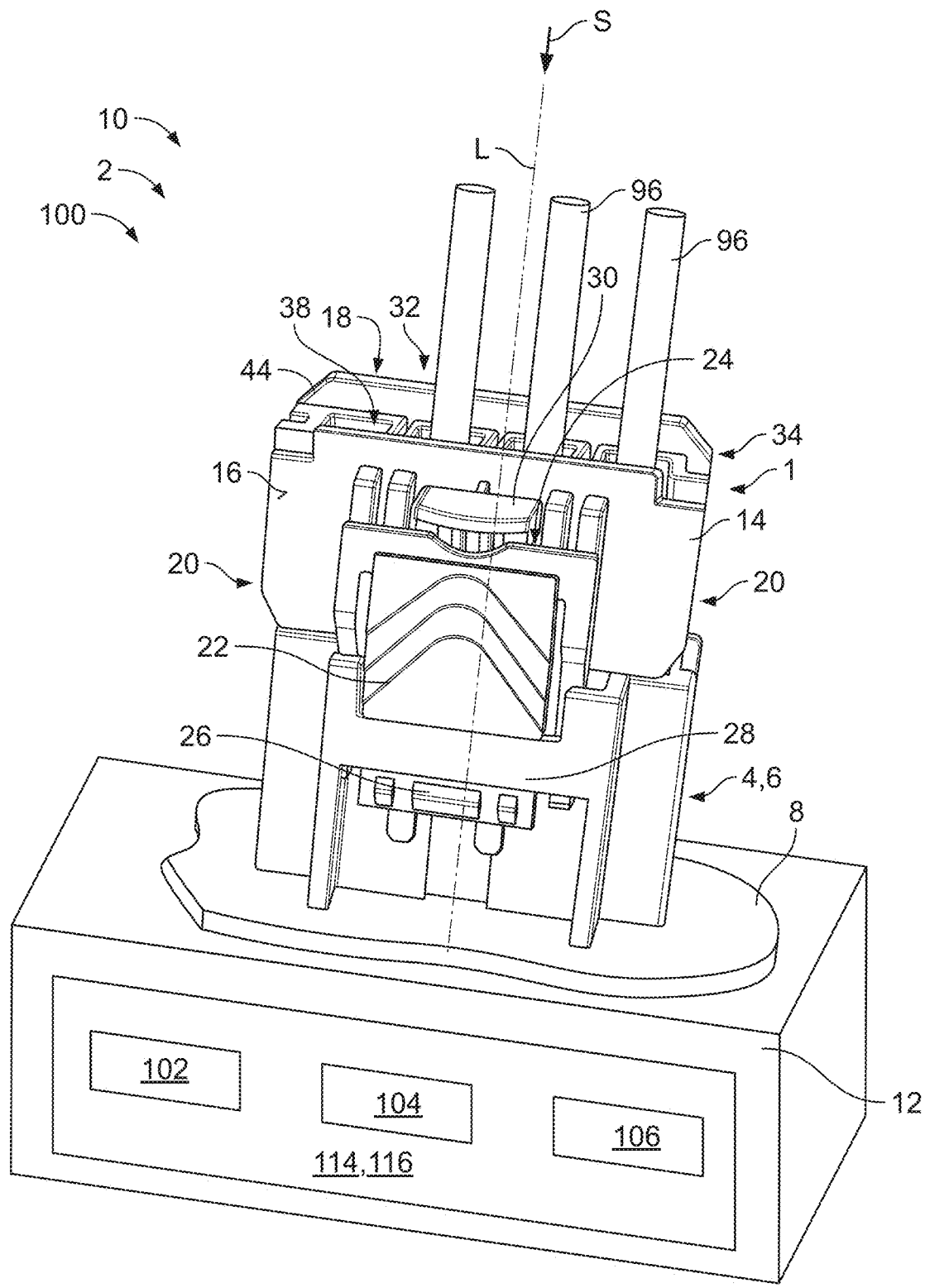
Figure 2:
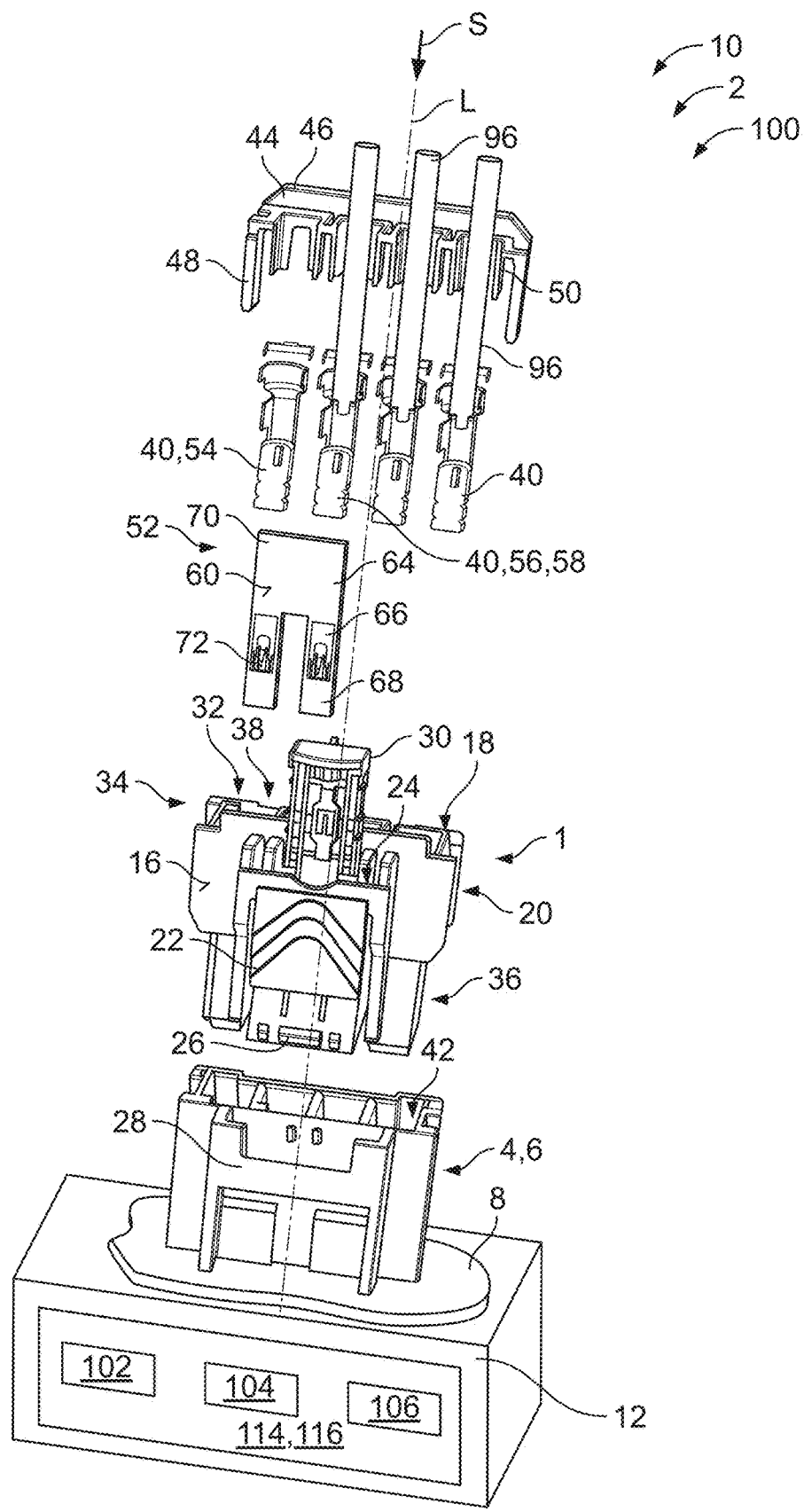
Figure 4:
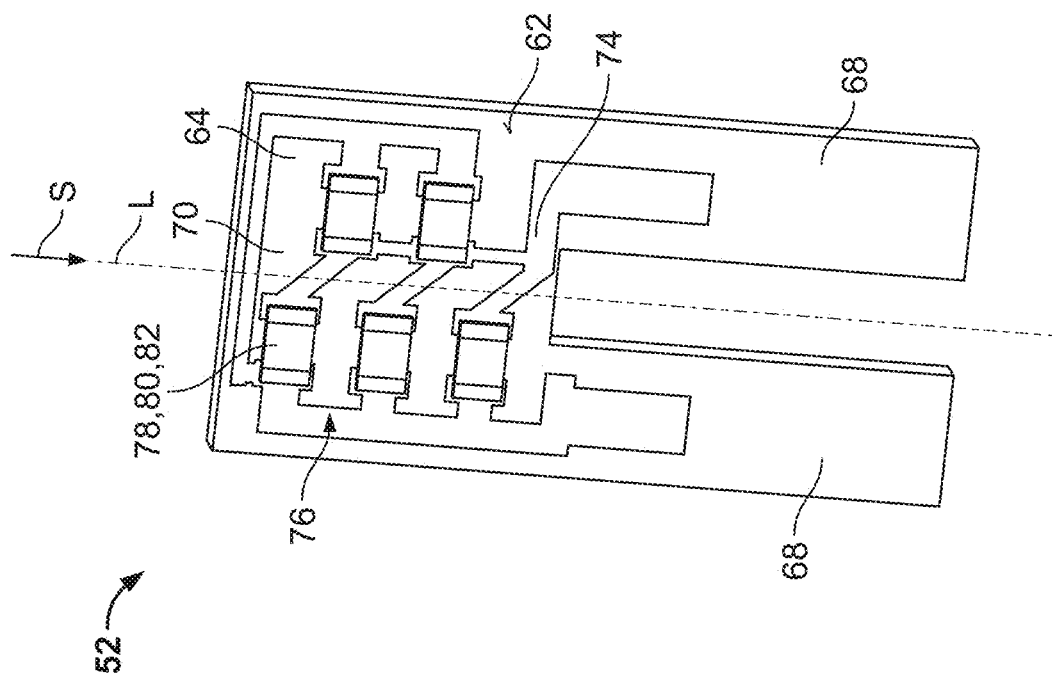
Figure 3:
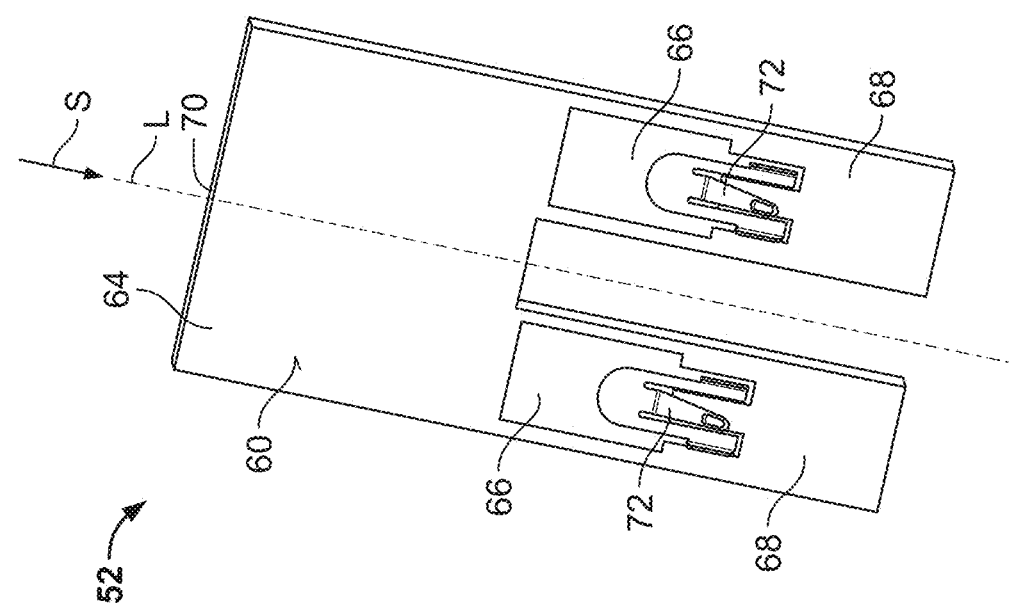
Figure 5:
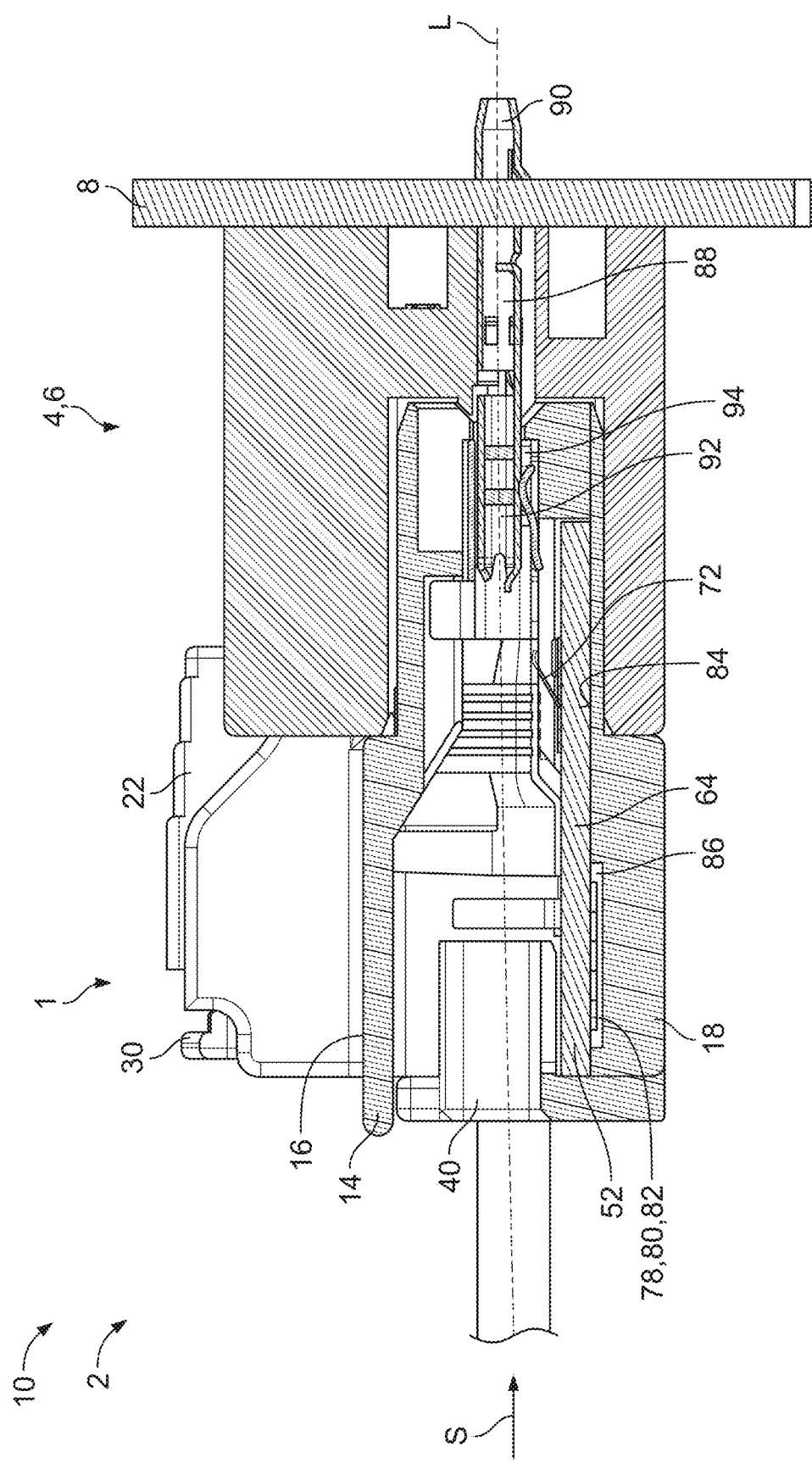
Figure 6:
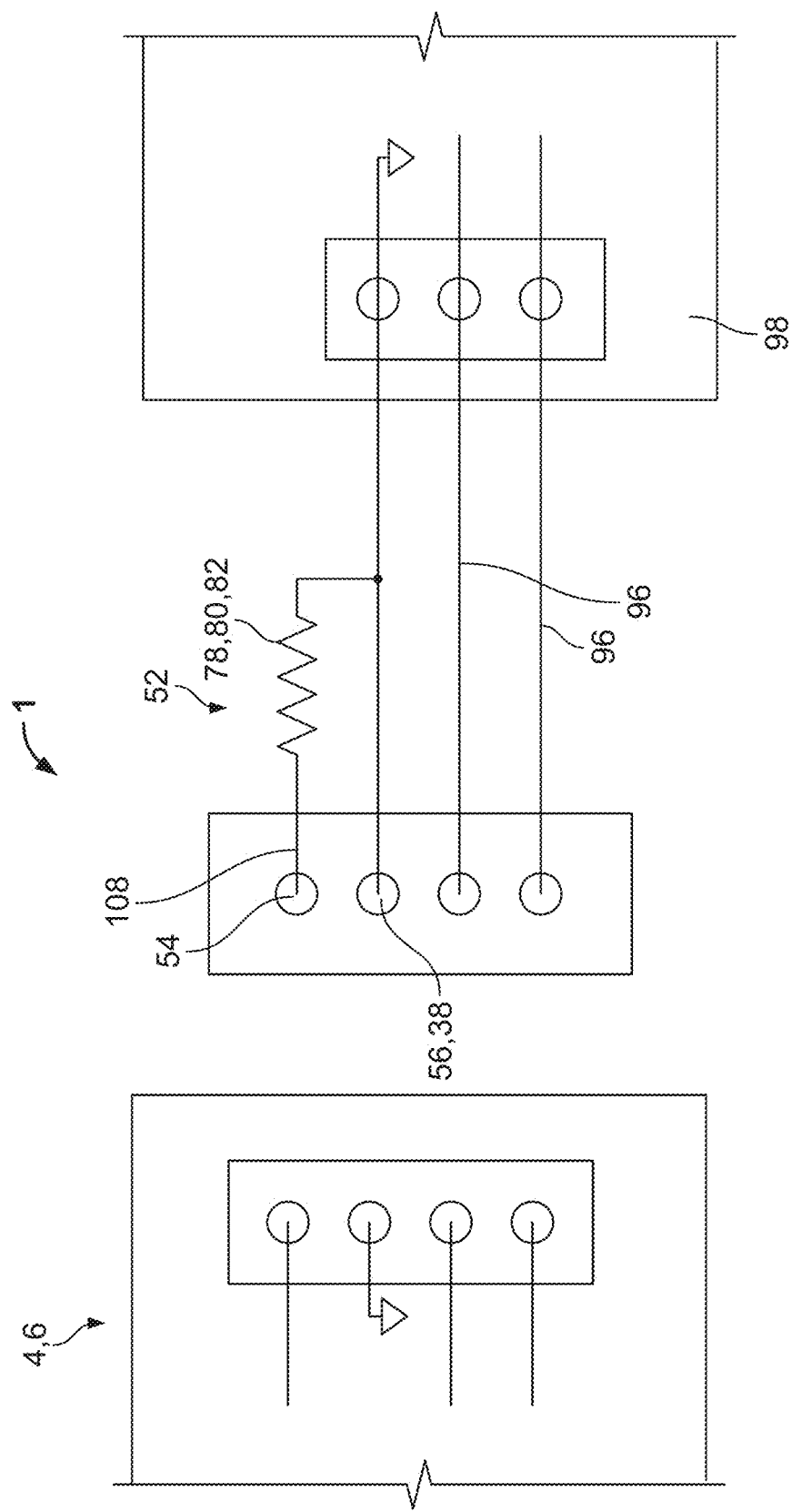
Figure 7:
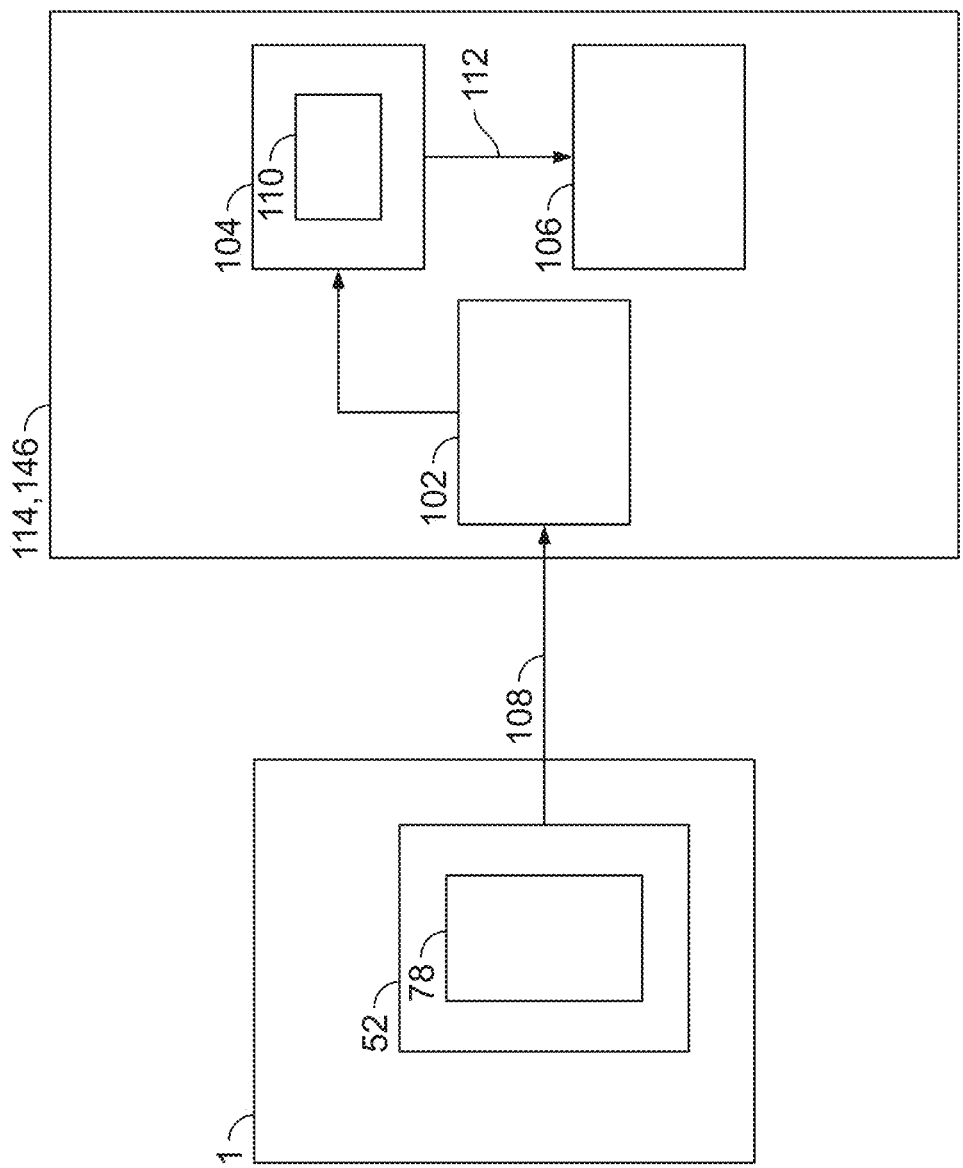
Figure 8:
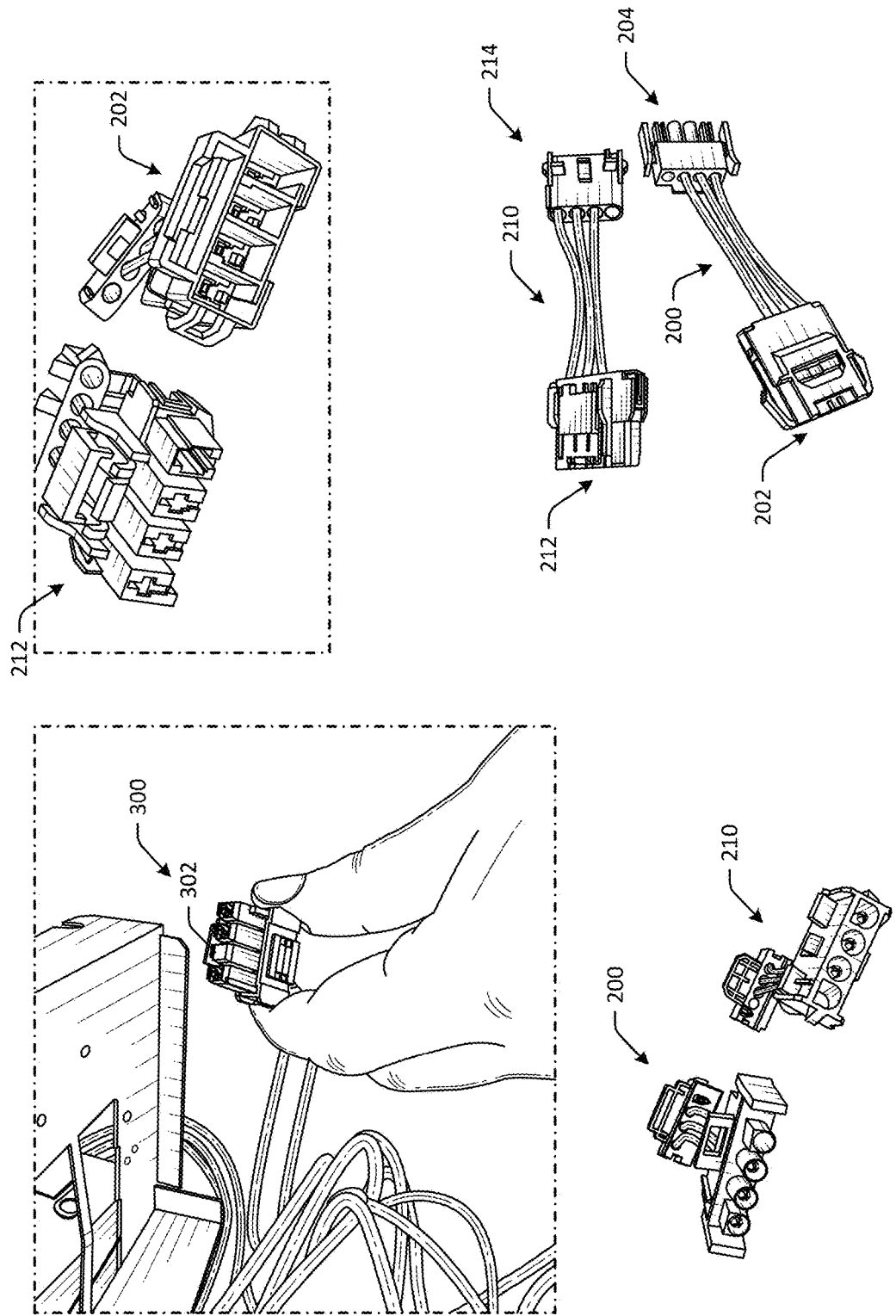

According to the description of the various aspects and embodiments, elements shown in the drawings can be omitted if the technical effects of those elements are not needed for a particular application, and vice versa, i.e., elements that are not shown or described with reference to the figures but are described above can be added if the technical effect of those particular elements is advantageous in a specific application. In the figures:

FIG. 1 shows an exemplary embodiment of an assembly including an exemplary embodiment of a plug-in connector according to the disclosure;

FIG. 2 shows an exploded view of the assembly shown in FIG. 1;

FIG. 3 shows a first perspective view of an exemplary embodiment of an identification device according to the disclosure;

FIG. 4 shows a second perspective view of the exemplary embodiment of the identification device;

FIG. 5 shows a schematic cut view of the assembly shown in FIG. 1;

FIG. 6 shows a schematic circuit diagram of the assembly of FIG. 1;

FIG. 7 shows a schematic block diagram of an exemplary embodiment of an authentication set; and FIG. 8 shows a number of embodiments of a plug-in connector as part of a wiring harness in accordance with one or more embodiments of the disclosure.

DETAILED DESCRIPTION

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In FIG. 1, an exemplary embodiment of a plug-in connector 1 according to the disclosure is shown in an assembly 2. The assembly 2 includes the plug-in connector 1 and a mating connector 4.

The mating connector 4 may be a header 6, which is configured to be mounted onto a circuit board 8, particularly a printed circuit board. Hence, the assembly of the plug-in connector 1 and the mating connector 4 may form a wire-to-board connector system 10. The circuit board 8 may be part of an electric device 12, such as an air handler.

As shown in FIG. 1, the plug-in connector 1 includes a housing 14 with a top wall 16, and oppositely facing bottom wall 18 and side walls 20 extending between the top wall 16 and the bottom wall 18. Hence, the housing 14 may have an essentially quadrilateral shape, particularly a rectangular shape. For locking the plug-in connector 1 to the mating connector 4 in a fully mated state, an elastically deflectable locking latch 22 may be formed on the top wall 16 of the housing 14. The elastically deflectable locking latch 22 may be formed on a protrusion such that a gap 24 is provided between the locking latch 22 and a surface of the top wall 16. The locking latch may be cantilevered having a free end extending along a longitudinal axis L in an insertion direction S. Latching projections 26 may protrude from the locking latch 22 essentially perpendicular to the longitudinal axis L away from the top wall 16, such that a recess is formed adjacent to the latching projections 26 for receiving a receiving a locking feature 28 of the mating connector 4.

FIG. 1 shows the locking engagement between plug-in connector 1 and the mating connector 4. Particularly, the locking feature 28 is fittingly received in the recess such that a movement of the plug-in connector 1 along the longitudinal axis L relative to the mating connector 4 is prevented. To further secure the locking engagement and prevent disengagement due to high vibrations or the like, the plug-in connector 1 may be provided with a secondary lock 30, which is configured to be inserted into the gap 24 and to block a deflection of the locking latch 22. Preferably, the secondary lock 30 may be held within the gap via press/friction fit. This can for example be implemented by providing the secondary lock 30 with springs, which press against an inner wall surrounding the gap 24 with a spring force.

The housing 14 may surround a receptacle 32, which extends from a cable receiving end 34 along the longitudinal axis L to a mating end 36 for mating with the mating connector 4. The receptacle is split into at least two adjacent terminal receiving cavities 38, in each of which a contact terminal 40 may be received. The separation of the terminals 40 in the respective terminal receiving cavities 38 may reduce or even prevent interference between the adjacent contact terminals 40.

At the mating end 36, the terminal receiving cavities 38 are separated and spaced apart from one another for insertion into split cavities 42 of the mating connector 4, as can be best seen in FIG. 2.

In FIGS. 1 and 2, the exemplary embodiment of the plug-in connector 1 has four contact receiving terminals 38 arranged adjacent to one another. In each of the four contact receiving terminals 38, a different contact terminal 40 is received. However, other numbers of terminal receiving cavities and/or terminals may be provided without departing from the scope of the disclosure.

A cover 44, as best shown in FIG. 2, may be provided. The cover 44 may include a top plan member 46 having openings that correspond to the terminal receiving cavities 38 of the housing 14. Furthermore, the cover 44 may include cover latching members 48 and terminal position assurance members 50 extending from the top plan member 46 essentially parallel to the longitudinal axis L.

The cover latching members are configured to engage a retention member of the housing in the locking position. In the locking position, as shown in FIG. 1, the terminal position assurance members 50 extend into the respective terminal receiving cavities 38 and are in contact with projections or shoulders of the respective terminals 40. If the terminals 40 are not properly positioned in the terminal receiving cavities 38, the terminal position assurance members engage the projection shoulder of the terminal to move them into position as the cover is pushed into the locking position. Alternatively, the terminals 40 may block further movement of the cover 44 towards the locking position, providing a visual indication that the terminals are not properly positioned in the respective terminal receiving cavities 38.

Such plug-in connectors 1 have to satisfy application-specific requirements in order to prevent damage to the electric device 12. An original equipment manufacturer designs the plug-in connector 1 to guarantee that these requirements are met. However, if third-party or counterfeit connectors and/or parts of the connectors are used, it can no longer be ensured that the application requirements are met, which may potentially damage the electric device 12 or even pose a health and safety risk.

In order to be able to validate the authenticity of the plug-in connector 1 and/or its parts, the plug-in connector 1 is further provided with an electric identification device 52 as is visible in FIGS. 2 to 5. The electric identification device 52 is arranged in the housing 14 and adapted to simultaneously contact at least two (exactly two in particular in the illustrated embodiment; other embodiments may contact a different number) terminals 40 of which one forms an output terminal 54. The electric identification device 52 includes a unique identifier that can be read out via the output terminal 54 for authenticating the OEM's part.

The electric identification device 52 may be adapted to be fully inserted into the housing 14, such that it is not visible from outside, particularly in a fully assembled state as depicted in FIG. 1. For this, an intermediate wall of the two adjacent terminal receiving cavities 38 may include a mounting slot (not shown) that is opened to the cable receiving end 34. The mounting slot may be dimensioned so as to fittingly receive the electric identification device 52 and securely hold it.

The output terminal 54 may be configured to be read out and be connected to the adjacent terminal via the identification device. Hence, the adjacent terminal may act as a reference terminal 56. The reference terminal can be a ground terminal 58. As the output terminal 54 received its input from the identification device and the connected reference terminal 56, the output terminal 54 is not terminated onto a cable.

As is apparent from the exploded view of the exemplary embodiment shown in FIG. 2, the plug connector 1 may include multiple terminals 40, thereby only two terminals, i.e. the reference terminal 56 and the output terminal 54 are connected to the electric identification device 52. Consequently, the size of the identification device 52 may be further reduced.

In the following, the structure and components of the electric identification device 52 is further elucidated with reference to FIGS. 3 and 4. FIG. 3 shows a top surface 60 facing the terminals 40 when mounted in the housing 14 and FIG. 4 shows a bottom surface 62 facing away from the terminals 40 when mounted in the housing 14.

The electric identification device 52 may include a circuit board 64, particularly a printed circuit board having contact areas 66. The contact areas 66 may be positioned on the circuit board so as to be arranged within the respective terminal receiving cavities 38 distanced from the mounting slot. Therefore, in some embodiments the circuit board 64 is essentially U-shaped having two members or beams 68 extending essentially parallel to one another and being connected to one another by a common base 70. The contact areas 66 may be positioned on the respective beams 68 and may be laid bare at the top surface 60 to establish contact with the corresponding terminals 40.

Plug-in connectors are subjected to various stresses such as vibrations and the like, during application. These stresses may cause an interruption of the contact between the terminals 40 and the respective contact areas 66. To prevent such an interruption, resilient contact springs 72 may be provided, each contact spring 72 being mounted to a contact area 66 and projecting towards the terminal 40 establishing an electric connection with between the terminal 40 and the contact area 66. Such a resilient contact spring 72 may compensate the vibrations and thus may lead to a stable connection.

The contact areas 66 may be in communication with one another via a conductive path 74 that extends from one contact area over the common base to the other contact area in a predetermined pattern 76.

The conductive path 74 may be accessible from the bottom surface 62 allowing mounting of electric components 78 onto the path 74. Hence, the terminals 40 do not damage, scratch or even rip the components 78 off from the circuit board 64 when inserting them into the respective terminal receiving cavities 38.

In order to further increase the difficulty of duplicating the plug-in connector 1, the identification device 52 may include a plurality of electric components 78, particularly analog electric components 80, which are mounted on the conductive path creating a unique identifier or even a set of unique identifiers. The unique identifier can be an analog electric parameter determined by the set of electric components 78. In this exemplary embodiment, the electric components 78 are resistors 82 each having different resistance values. However, other electric components, such as capacitors or the like can also be used in combination or instead of resistors.

The conductive path may be arranged such that each of the electric components 78 are arranged parallel to one another, allowing a set of different parameter values to be read out via the output terminal 54. As can be seen in FIG. 4, a set of five electric components 78, i.e. resistors 82, may be provided and arranged parallel to one another in the circuit, such that two resistors 82 are arranged in one terminal receiving cavity and the other three resistors 82 are received in the other terminal receiving cavity. The parallel arrangement of the components 78 allows a large amount of different parameter values to be read out. The parameter values may correspond to the respective value of each individual electric component as well as the sum of two or more components. These parameter values may form unique identifiers which, in turn, form a composite unique identifier including a list of these parameter values.

In FIG. 5, the identification device 52 is shown inside the housing 14 of the plug-in connector 1 in a schematic cut view.

Particularly, the beams 68 may rest on a planar resting surface 84 of the housing 14, such that a stable connection with the terminals 40 can be established. Hence, the electric components 78 may preferably be arranged at the common base 70. Each terminal receiving cavity 38 may be provided with a depression 86 formed on the resting surface 84 at the height of the common base 70. Hence, the electric components 78 may be received in the depression 86 and damage due to high pressure from the resting surface on the electric components 78 may be prevented.

Furthermore, the mating connector 4 is shown in FIG. 5. The mating connector 4 includes contact pins 88 arranged in the split cavities 42. The contact pins 88 have circuit board mating portions 90 which penetrate the circuit board 8 and plug-in connector mating portions 92 which are received in contact pin receiving sections 94 of the plug-in connector's terminals 40.

Furthermore, an authentication set 100 may be provided, the authentication set 100 including the plug-in connector 1, a reading unit 102 adapted to read out the unique identifier from the output terminal 54 and an evaluation unit 104 adapted to compare the unique identifier with predetermined identification information stored in the evaluation unit 104.

Furthermore, the authentication set 100 may include a control unit 106 configured to enable a power and/or data path to the mating connector 4 and/or electric device 12.

The reading unit 102, evaluation unit 104 and control unit 106 may be integrated in the mating connector 4 and/or the electric device 12 and are schematically shown in FIG. 1.

FIG. 6 depicts a schematic circuit diagram with a plug-in connector 1 as described above. The plug-in connector 1 includes four terminals 40 arranged next to one another in respective terminal receiving cavities 38. Two terminals 40 may be attached to a line, such as a power line 96 that is connected to a power supply 98. The ground terminal 58 is attached to a grounding line, for example via a crimp connection and forms the reference terminal 56 for the identification device 52. In some embodiments, the power lines 96 may be separated from the ground line by at least one terminal (e.g., the identification device 52 may be inverted, etc.). Via the identification device 52, a connection is established between the ground terminal 58 and the output terminal 54. The identification device 52 is provided with electric components 78 that produce an electric parameter value. In this exemplary embodiment, the electric components 78 are resistors 82. The mating connector 4 may include a contact pin to contact the output terminal 54 that is connected to the reading unit 102. The reading unit 102 may thus read out the unique identifier and the evaluation unit 104 may compare the unique identifier with stored, predetermined identification information.

For further understanding, a schematic block diagram of the authentication set is provided with FIG. 7.

The plug-in connector 1 includes the identification device 52 having a unique identifier 108 which can be read out via the output terminal 54 by the reading unit 102. The evaluation unit 106 may access the information provided by the reading unit 102 and compare it with predetermined identification information 110 stored in the evaluation unit 106. If the unique identifier 108 matches the predetermined identification information 110, the authenticity of the plug-in connector 1 may be verified.

As already explained before, the unique identifier 108 may be a composite unique identifier including multiple parameter values. In this case, the evaluation unit 106 may include a list of predetermined identification information 110 which may be compared. However, it is preferred that the amount of predetermined identification information 110 is smaller than the amount of different parameter values readable from the identification device 52 via the output terminal 54.

When the unique identifier 108 matches the predetermined identification information 110, the evaluation unit 106 may be configured to output a signal 112. Said signal 112 may for example be transmitted to the control unit 106 which, in turn, enables the power and/or data path from the plug-in connector 1 to the electric device 12.

A computer 114 may be provided, which includes at least one of the reading unit 102, evaluation unit 104 and, if available, the power control unit 106. The computer 114 may be a microprocessor 116 allowing an easy integration into the mating connector 4 and/or the electric device 12.

FIG. 8 depicts a number of different wiring harnesses coupled to example plug-in authenticators. The harnesses may include one or more coupling mechanisms on ends of the wiring harnesses. For example, a first wiring harness 200 may be configured to couple to an HVAC system component, another wiring harness, or another system. The first wiring harness 200 may have a first male connector 202 configured to engage a first female connector 212 of a second wiring harness 210. Similarly, the second wiring harness 210 may have a second female connector 214 configured to receive a second male connector 204 of the first wiring harness 200. Other configurations may be used for wiring harnesses and the corresponding distribution of male and female connectors. In another embodiment of a plug-in authenticator 300, at least one terminal 302 may form a gap between the power lines 96 and ground line. For example, the output terminal 54 may be disposed between the power lines 96 and ground line.

While the present disclosure has been described in connection with a plurality of exemplary aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

Embodiment 1 may include a plug-in connector comprising: a housing having at least two contact terminals received in adjacent terminal receiving cavities, wherein an electric identification device is arranged in the housing and adapted to simultaneously contact the at least two contact terminals, the electric identification device comprising a unique identifier, wherein one of the at least two contact terminals is an output terminal of the identification device, and wherein the unique identifier of the electric identification device is adapted to be read out via the output terminal for authenticating the plug-in connector.

Embodiment 2 may include Embodiment 1, wherein the identification device is an analog electric device.

Embodiment 3 may include any one of Embodiments 1 to 2, wherein the identification device comprises a circuit board extending into the terminal receiving cavities, wherein the circuit board comprises contact areas arranged within the terminal receiving cavities and facing the contact terminals received in the respective terminal receiving cavity, the contact areas being in communication with one another.

Embodiment 4 may include any one of Embodiments 1 to 3, wherein the at least one contact spring is provided, the at least one contact spring being mounted on the contact area and being in electric contact with the respective contact terminal.

Embodiment 5 may include any one of Embodiments 1 to 4, wherein the identification device further comprises at least one electric component mounted on the circuit board on a conductive path between the contact areas.

Embodiment 6 may include any one of Embodiments 1 to 5, wherein the at least one electric component and the contact areas are arranged on opposite surfaces facing away from one another.

Embodiment 7 may include any one of Embodiments 1 to 6, wherein at least two electric components are provided, the at least two electric components being arranged in parallel to one another.

Embodiment 8 may include any one of Embodiments 1 to 7, wherein at least one of the at least one electric component is an analog electric component and wherein the unique identifier is an analog electric parameter determined by the at least one analog electric component.

Embodiment 9 may include any one of Embodiments 1 to 8, wherein the analog electric parameter is at least one of a resistance and a capacitance.

Embodiment 10 may include any one of Embodiments 1 to 9, wherein at least two electric components are provided, the at least two electric components being of the same type and having a different parameter value.

Embodiment 11 may include any one of Embodiments 1 to 10, wherein the identification device is a digital electric device.

Embodiment 12 may include any one of Embodiments 1 to 11, wherein the housing comprises four contact terminals received in four adjacent terminal receiving cavities.

Embodiment 13 may include any one of Embodiments 1 to 12, wherein the electronic identification device is disposed in two adjacent terminal receiving cavities, and power lines are coupled to the remaining two adjacent terminal receiving cavities.

Embodiment 14 may include any one of Embodiments 1 to 13, wherein a ground line is disposed in an outer one of the four adjacent terminal receiving cavities, such that the output terminal is disposed adjacent to one of the terminal receiving cavities coupled to a power line.

Embodiment 15 may include any one of Embodiments 1 to 14, wherein the output terminal is disposed at an outer one of the four adjacent terminal receiving cavities.

Embodiment 16 may include an authentication set comprising: a plug-in connector comprising: a housing having at least two contact terminals received in adjacent terminal receiving cavities, wherein an electric identification device is arranged in the housing and adapted to simultaneously contact the at least two contact terminals, the electric identification device comprising a unique identifier, wherein one of the at least two contact terminals is an output terminal of the identification device, and wherein the unique identifier of the electric identification device is adapted to be read out via the output terminal for authenticating the plug-in connector; a reading unit adapted to read out the unique identifier; and an evaluation unit adapted to compare the unique identifier with the predetermined identification information.

Embodiment 17 may include Embodiment 16, wherein the authentication set further comprises: a control unit enabling a power and data path through a mating connector or electric device upon authentication of the plug-in connector.

Embodiment 18 may include a plug-in connector for a heating, ventilation, and air conditioning (HVAC) system, the plug-in connector comprising: a housing comprising a first terminal receiving cavity, a second terminal receiving cavity, a third terminal receiving cavity, and a fourth terminal receiving cavity; a first contact terminal disposed in the first terminal receiving cavity; a second contact terminal disposed in the second terminal receiving cavity; a third contact terminal disposed in the third terminal receiving cavity; a fourth contact terminal disposed in the fourth terminal receiving cavity; an electric identification device disposed in the housing, wherein the electric identification device is in contact with the first contact terminal and the second contact terminal, and wherein the electric identification device comprises a unique identifier; and wherein one of the first contact terminal or the second contact terminal is an output terminal of the electric identification device; and wherein the unique identifier of the electric identification device is configured to be determined via the output terminal for authenticating the plug-in connector.

Embodiment 19 may include Embodiment 18, wherein the terminal receiving cavities are arranged such that the first terminal receiving cavity is disposed at a first outer end, the second terminal receiving cavity is adjacent to the first terminal receiving cavity, the third terminal receiving cavity is adjacent to the second terminal receiving cavity, and the fourth terminal receiving cavity is disposed at a second outer end.

Embodiment 20 may include any one of Embodiments 18 to 19, wherein the second contact terminal is the output terminal.

Embodiment 21 may include any one of Embodiments 18 to 20, wherein the output terminal is not terminated onto a cable.

Embodiment 22 may include any one of Embodiments 18 to 21, wherein the first contact terminal is the output terminal.

Embodiment 23 may include any one of Embodiments 18 to 22, wherein the output terminal is not terminated onto a cable.

Embodiment 24 may include any one of Embodiments 18 to 23, wherein the third contact terminal is terminated onto a first power line, and the fourth contact terminal is terminated onto a second power line.

Embodiment 25 may include any one of Embodiments 18 to 24, wherein the first contact terminal is terminated onto a ground line.

Embodiment 26 may include any one of Embodiments 18 to 25, wherein the second contact terminal is terminated onto a ground line.

Embodiment 27 may include any one of Embodiments 18 to 26, wherein the unique identifier of the electric identification device is configured to be determined via the output terminal for authenticating a component of the HVAC system.

Embodiment 28 may include a plug-in connector for a heating, ventilation, and air conditioning (HVAC) system, the plug-in connector comprising: a housing comprising a first terminal receiving cavity, a second terminal receiving cavity, a third terminal receiving cavity, and a fourth terminal receiving cavity; a first contact terminal disposed in the first terminal receiving cavity; a second contact terminal disposed in the second terminal receiving cavity; a third contact terminal disposed in the third terminal receiving cavity, wherein the third contact terminal is terminated onto a first power line; a fourth contact terminal disposed in the fourth terminal receiving cavity, wherein the fourth contact terminal is terminated onto a second power line; an electric identification device disposed in the housing, wherein the electric identification device is in contact with the first contact terminal and the second contact terminal, and wherein the electric identification device comprises a unique identifier; and wherein one of the first contact terminal or the second contact terminal is an output terminal of the electric identification device, and wherein the output terminal is not terminated onto a cable; and wherein the unique identifier of the electric identification device is configured to be determined via the output terminal for authenticating the plug-in connector.

Embodiment 29 may include Embodiment 28, wherein the second contact terminal is the output terminal.

Embodiment 30 may include any one of Embodiments 28 to 29, wherein the second contact terminal is terminated onto a ground line.

The invention claimed is:

1. A plug-in connector comprising:
  a housing having four adjacent terminal receiving cavities, and a first contact terminal disposed in one of the terminal receiving cavities, wherein the four adjacent terminal receiving cavities are disposed in a linear arrangement, and wherein the first contact terminal is an output terminal for an identification device, the identification device comprising a resistor;

wherein the identification device is in electrical communication with the output terminal, and wherein the identification device is configured to authenticate the plug-in connector; and wherein authentication of the plug-in connector facilitates establishment of at least one of: a power or data path.

2. The plug-in connector of claim 1, wherein the at least one of the power or data path is established through a mating connector or electric device.

3. The plug-in connector of claim 1, wherein the identification device comprises a unique identifier, the unique identifier comprising a resistance value that is read out via the output terminal for authenticating the plug-in connector.

4. The plug-in connector of claim 1, wherein the identification device is an inline resistor disposed along a control line coupled to the first contact terminal.

5. The plug-in connector of claim 1, wherein the identification device is configured to authenticate a component of a heating, ventilation, and air conditioning system.

6. The plug-in connector of claim 1, wherein at least one of the terminal receiving cavities is non-functional.

7. The plug-in connector of claim 1, wherein at least two of the terminal receiving cavities have different cross-sectional geometries.

8. The plug-in connector of claim 1, wherein at least two of the terminal receiving cavities have different input face configurations.

9. The plug-in connector of claim 1, wherein the output terminal is disposed at an outer one of the four adjacent terminal receiving cavities.

10. The plug-in connector of claim 1, further comprising a second contact terminal that is coupled to a first control line.

11. The plug-in connector of claim 10, wherein the first control line is disposed in a static position in a first outer one of the four adjacent terminal receiving cavities, and the output terminal is coupled to a second control line disposed in a static position in a second outer one of the four adjacent terminal cavities.

12. The plug-in connector of claim 1, wherein the housing is configured to support a control line coupled to the first contact terminal, wherein the control comprises the identification device and the identification device is disposed in a static position.

13. The plug-in connector of claim 1, wherein the plug-in connector is configured to be coupled to a heater kit device.

14. The plug-in connector of claim 1, wherein the resistor has a fixed resistance value.

15. A plug-in connector for a heating, ventilation, and air conditioning system, the plug-in connector comprising:

a housing comprising a first terminal receiving cavity, a second terminal receiving cavity, and a third terminal receiving cavity, and;

a first contact terminal disposed in the first terminal receiving cavity, the first contact terminal having a hollow rectangular geometry;

a second contact terminal disposed in the second terminal receiving cavity, the second contact terminal having a hollow rectangular geometry;

a third contact terminal disposed in the third terminal receiving cavity, the third contact terminal having a hollow rectangular geometry; and a control line comprising an identification device, wherein the identification device is an inline resistor;

wherein one of the first contact terminal or the second contact terminal is an output terminal of the identification device; and wherein the unique identifier of the identification device is configured to authenticate the plug-in connector.

16. The plug-in connector of claim 15, wherein at least two of the contact terminals are coupled to control lines, and wherein a first control line is disposed in a static position in a first outer one of the four adjacent terminal receiving cavities, and the output terminal is disposed coupled to a second control line disposed in a static position in a second outer one of the four adjacent terminal cavities.

17. The plug-in connector of claim 15, wherein at least two of the terminal receiving cavities have different cross-sectional geometries.

18. The plug-in connector of claim 15, wherein the unique identifier is a resistance value.

19. The plug-in connector of claim 15, wherein the unique identifier of the identification device is configured to read out for authenticating a component of the HVAC system.

20. A plug-in connector comprising:

a housing having at least two contact terminals disposed in adjacent terminal receiving cavities, wherein the at least two adjacent terminal receiving cavities are disposed in a linear arrangement, and wherein at least one of the at least two contact terminals is an output terminal for an identification device, the identification device comprising a resistor;

wherein at least two of the terminal receiving cavities have different cross-sectional geometries, and wherein at least two of the terminal receiving cavities have different input face configurations;

wherein the identification device is in electrical communication with the output terminal, and wherein the identification device is configured to authenticate the plug-in connector; and wherein the unique identifier of the identification device is configured to be determined via the output terminal for authenticating the plug-in connector.

\* \* \* \* \*